United States Patent [19]

Kawahito et al.

[11] Patent Number: 5,295,605

[45] Date of Patent: Mar. 22, 1994

[54] SHUTTER DEVICE FOR PRESSURE CONTAINER

[75] Inventors: Akiyoshi Kawahito; Kazusi Hondo; Takashi Nishimura; Takeshi Akune, all of Matsuyama, Japan

[73] Assignee: Miura Research Co., Ehime, Japan

[21] Appl. No.: 849,035

[22] PCT Filed: Oct. 25, 1990

[86] PCT No.: PCT/JP90/01375

§ 371 Date: Apr. 21, 1992

§ 102(e) Date: Apr. 21, 1992

[87] PCT Pub. No.: WO91/06792

PCT Pub. Date: May 16, 1991

[30] Foreign Application Priority Data

| Oct. 25, 1989 | [JP] | Japan | 1-278928 |
| Jan. 31, 1990 | [JP] | Japan | 2-9055[U] |
| Mar. 20, 1990 | [JP] | Japan | 2-28788[U] |
| Mar. 20, 1990 | [JP] | Japan | 2-28791[U] |
| Mar. 20, 1990 | [JP] | Japan | 2-28792[U] |
| Mar. 22, 1990 | [JP] | Japan | 2-29680[U] |

[51] Int. Cl.⁵ ............................................. B65D 43/20
[52] U.S. Cl. ............................ 220/345; 220/211; 220/240; 220/350; 220/582; 160/188; 160/201; 160/230
[58] Field of Search .............. 220/211, 240, 345, 346, 220/347, 348, 349, 350, 582; 217/62; 160/40, 41, 230, 231.1, 231.2, 138, 309, 310, 311, 201, 188

[56] References Cited

U.S. PATENT DOCUMENTS

| 2,000,162 | 5/1935 | Buscham | 160/231.1 X |
| 2,107,997 | 2/1938 | Horsley | 220/345 X |
| 2,214,653 | 9/1940 | Barlough | 160/231.1 X |
| 2,690,216 | 9/1954 | Scott | 160/231.2 X |
| 2,732,201 | 1/1956 | Franko | 160/188 |
| 3,129,040 | 4/1964 | De Rose | 160/188 X |
| 3,339,785 | 9/1967 | Nugent | 220/346 X |
| 3,478,916 | 11/1969 | Linder | 220/345 |
| 4,162,024 | 7/1979 | Shanley | 220/350 |
| 4,352,439 | 10/1982 | Makhijani | 220/316 |
| 4,628,646 | 12/1986 | Eyerle | 160/201 X |

FOREIGN PATENT DOCUMENTS

| 45807 | 12/1974 | Japan . |
| 14406 | 4/1978 | Japan . |
| 30728 | 7/1980 | Japan . |
| 41985 | 10/1980 | Japan . |
| 21 | 1/1981 | Japan . |
| 45949 | 9/1982 | Japan . |

Primary Examiner—Allan N. Shoap
Assistant Examiner—Vanessa Caretto
Attorney, Agent, or Firm—Kirchstein et al.

[57] ABSTRACT

A shutter for large pressure vessels comprises a lid assembly (Y) constituted of a seal plate (1) formed of a flexible material of a size fit for the opening of a pressure vessel and a multitude of beam members (2) attached to the outer surface of the plate (1) and extending widthwise. The beam members are connected to the seal plate in such a manner as to be parallel to each other along a reference line for connection, extending in the widthwise direction of the seal plate, and advance or retreat while flexing along a guide member (7) having at least one bending portion (71). The guide member extends between a closing position (A) disposed in front of the opening portion and a storage position (B) disposed on an outer housing of the pressure vessel, so that the assembly can be housed in a relatively small space. This shutter is most suitable for use on a medical autoclave and a retort for food processing.

10 Claims, 6 Drawing Sheets

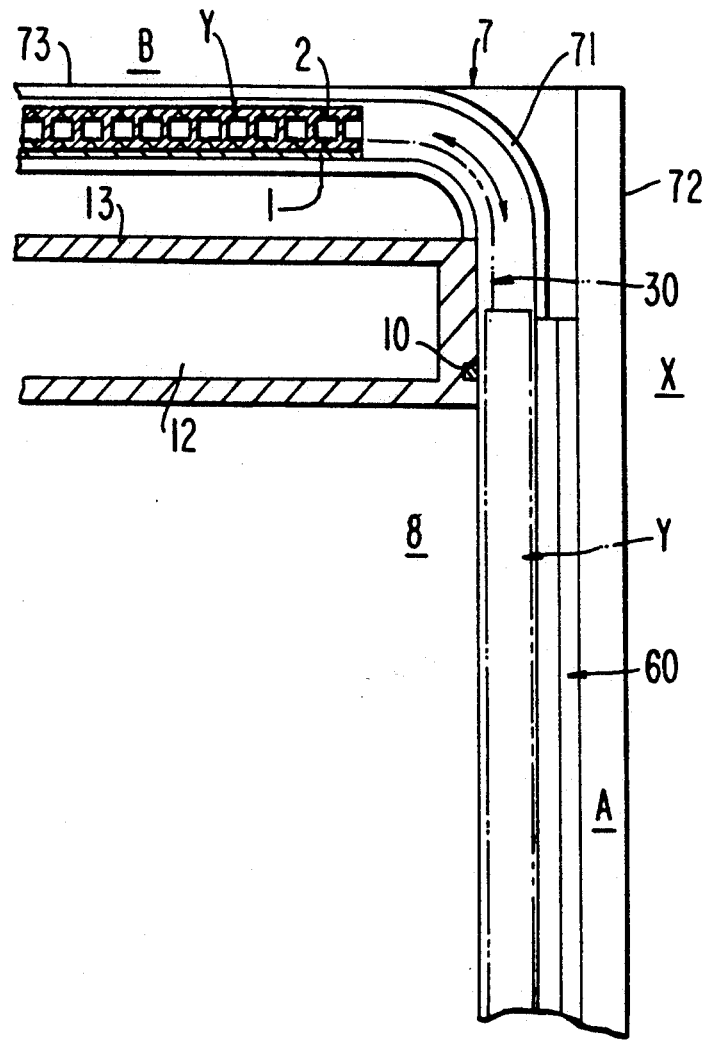
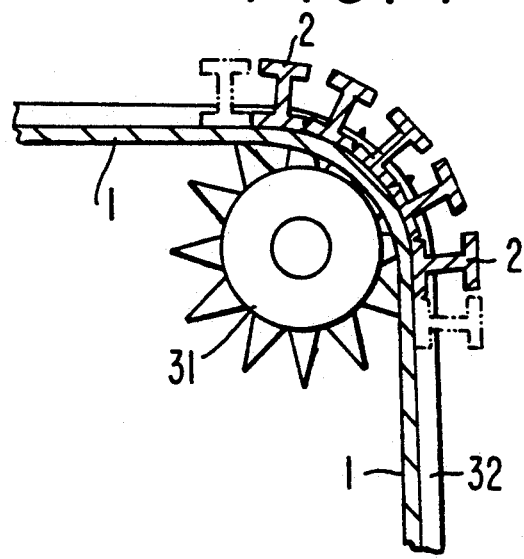

SHUTTER DEVICE FOR PRESSURE CONTAINER

BACKGROUND OF THE INVENTION

1. Field of the Invention

This invention relates to a lid assembly for pressure containers and the creation of an opening and closing mechanism therefor. A shutter device constructed according to this invention is most suitable for use in a pressure container having an internal treating chamber adapted to be controlled alternately to have a pressurized state and a depressurized state.

2. Description of the Related Art

As is known in the art, since lids for pressure containers, such as autoclaves for medical use and retorts for food processing, require strength and fluid tightness, they are constructed of relatively thick, heavy-weight members. An opening and closing mechanism connected to such a lid tends to be a necessarily large-sized rugged structure in order to attain reliability and safety in operation. According to a known lid and a known lid opening and closing mechanism, there is provided a lid body which is sized to suit the opening and the lid body is supported for opening and closing on a support shaft in the lateral surface, so that when the opening is closed, the front ends of a plurality of clamping rods on the lid body engage the peripheral edge of the opening to lock the entire lid body.

In the field of storage and transport techniques, as shown in Japanese Utility Model Publication No. 14406 to 1978, there is proposed a lid device (of the lift type) comprising a dome-shaped lid body adapted to be lifted from the position in front of the opening in a container to an upper retracted position by a link mechanism including a hydraulic cylinder and a bell crank. Further, as in the case of Japanese Utility Model Publication No. 21 of 1981, there are some known ones (of the slide type) wherein an angularly shaped lid body is adapted to be moved vertically or horizontally between guide rails on opposite sides of the container through a chain and sprocket device (for example, Japanese Utility Model Publication No. 45807 of 1974, and Japanese Patent Publication No. 45949 of 1982).

Although these known lid devices are substantially satisfactory in strength, they require a wide space for moving the lid body during the opening and closing operation. Besides these, there are many other known ones which, in the opened state, require a wide storage space for the lid body outside the container. This is a limiting factor in installing a pressure container in a limited space in a factory or facilities, obstructing wide use of large-sized pressure containers.

On the other hand, concerning ideas relating to storage of a lid or shield plate for shielding the opening, there are proposed a shutter mechanism for houses as described in Japanese Utility Model Publication No. 41985 of 1980 and a carrier shutter for refrigerator cars as shown in Japanese Utility Model Publication No. 30728 of 1980. They comprise a number of shutter panels connected in the longitudinal direction (direction of movement), such shutter panels being adapted to be bent at junctions between adjacent panels during the opening and closing operation. Therefore, when such shutter panels are used, all panels can be moved along the outer housing surrounding the shield space until they are stored compactly in a desired place.

This type of shutter is useful in that the storage space therefor can be minimized, but has received no proper attention as to retention of fluid tightness, particularly pressure resistance in a state where a pressure above atmospheric pressure is present.

Generally, in the case where a pressure-resistant type lid structure is applied to a pressure container such as an autoclave for medical use, proper measures must be taken as to the fact that at the same time as the entire lid body together with the pressure container is pressurized, it is heated as well. In reality, in treatment by an autoclave, sterilization treatment is performed usually at a pressure of 1.5–2.0 kg/cm$^2$ and a temperature of about 130° C., or drying treatment is performed at a reduced pressure of about −760 mmHg; therefore, it is required that the lid and the lid opening and closing mechanism be capable of resisting both pressurized and depressurized states and have sufficient heat resistance.

SUMMARY OF THE INVENTION

1. Objects of the Invention

This invention has created a novel shutter device for pressure containers overcoming the technical problems described above and is intended to provide a bendable lid assembly superior in pressure resistance and capable of retaining sufficient fluid tightness even in a heated environment and also provide an opening and closing mechanism therefor.

Another object of this invention is to provide a lid assembly adapted to be smoothly moved from the opening in a pressure container to a storing place around an outer housing, and stored in a storing chamber of relatively small space provided in the place, and also provide an opening and closing mechanism therefor.

Another object of this invention is to provide a lid assembly capable of retaining a predetermined strength and fluid tightness in both the pressurized state (pressing force) and the depressurized state (sucking force), and also provide an opening and closing mechanism therefor.

Other objects and features of the invention will be best understood from the following description of embodiments of the invention.

2. Features of the Invention

A shutter device constructed according to this invention comprises a seal plate made of plastic material and sized to fit the opening in a pressure container, and a number of beam members applied to the outer surface of the seal plate and extending in the direction of the width. This assembly is adapted to advance or retreat while bending along a guide rail having at least one bend and installed to extend between a closed position in front of the opening and a suitable stored position on an outer housing.

In the closed position, the assembly is pressed against the opening by suitable pressing means and functions to close the opening by the action of cooperation with the seal plate on the opening. In this state, the seal plate is applied to the beam members on the rear surface, with the result that whether the treating chamber is in the positive pressure or pressurized state or in the negative pressure or depressurized state, fluid tightness is never spoiled.

BRIEF DESCRIPTION OF THE DRAWINGS

FIG. 3 is a fragmentary side view, showing the opening and closing operation of the shutter device;

FIG. 4 is an enlarged fragmentary view, showing an example of means for moving a lid assembly in the shutter device;

DETAILED DESCRIPTION OF THE PREFERRED EMBODIMENTS

Figure 1:
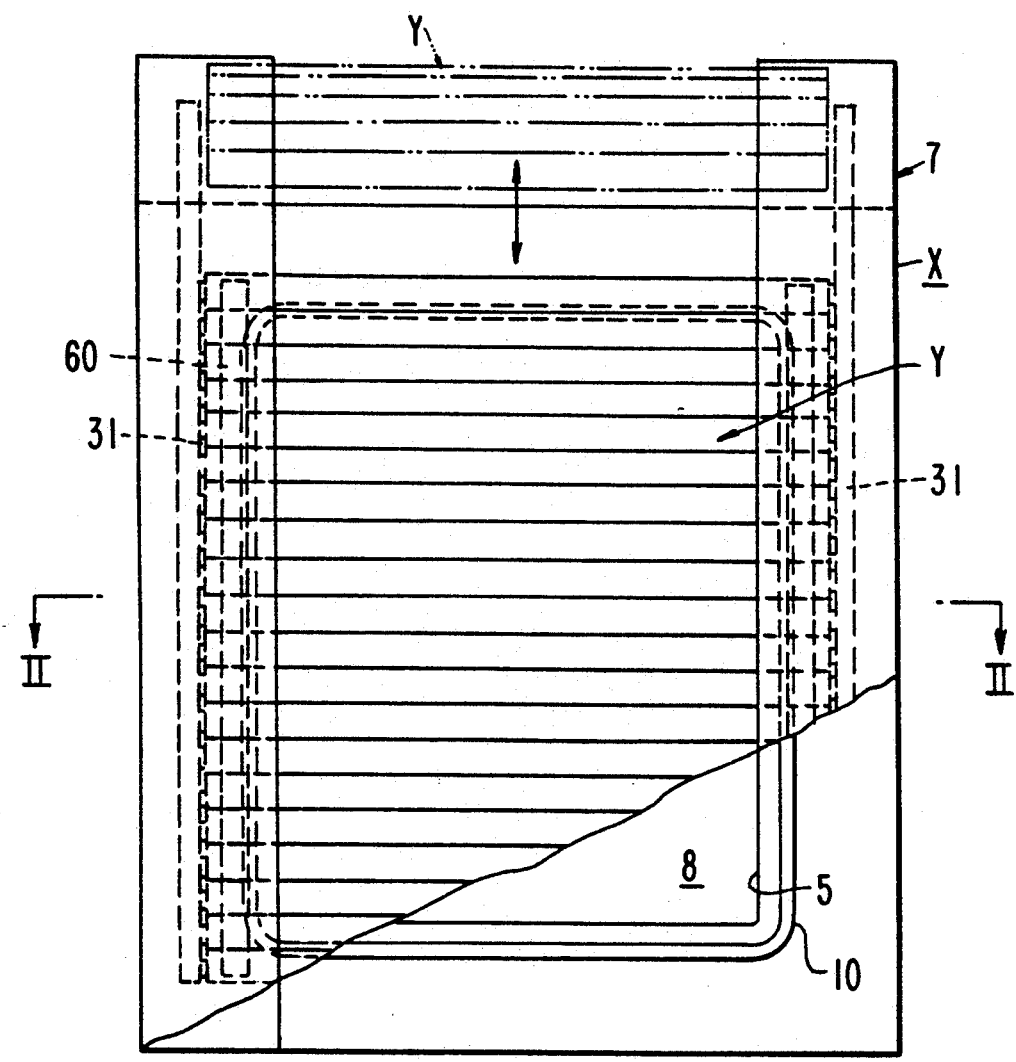
FIG. 1 is a front view, partly broken away, schematically showing a shutter device according to this invention.
Figure 2:
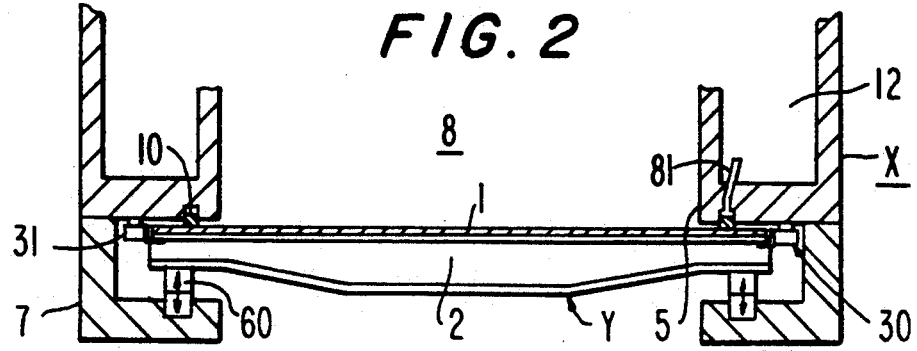
FIG. 2 is a fragmentary sectional view of the shutter device, taken along the line II—II in FIG. 1.

The attached drawings show preferred embodiments of this invention applied to an autoclave for sterilization treatment.

In the drawings, the character (X) denotes an autoclave body as a pressure container, including a treating chamber, that is, a sterilizing chamber 8, and a steam chamber 12 surrounding the same to serve as a heat source. At one end of the pressure container, there is an opening 5 for taking in and out an object to be sterilized, and a lid assembly (Y) according to this invention is installed to cover the opening 5. Such lid assembly comprises a flexible thin plate, that is, a seal plate 1, and a number of beam members 2 applied to the outer side of said seal plate; thus, the surface of the thin plate member 1 having no beam members 2 is pressed against a seal member 10 disposed on the periphery of the opening, whereby the sterilizing chamber 8 is closed. An example of pressing means 60 used therefor will be later described in detail with reference to FIG. 12 or 15.

The beam members 2 are widthwise connected at portions where they contact the seal plate 1, with adjacent beam members being in a free state rather than fixed together. Therefore, when the seal plate 1 is bent, the circumferential clearance between adjacent beam members 2 increases, thereby allowing smooth bending of the entire lid assembly. With the arrangement thus made, the lid assembly (Y) can be slid parallel with the lateral wall of the pressure container (in the illustrated embodiment, parallel with the upper wall) through suitable guide means until it is stored.

The numeral 7 denotes a guide member forming a stationary track serving as a guide when the lid assembly (Y) is stored, the guide member extending between a closed position (A) and a stored position (retracted position) (B), with a bent position 71 disposed interposed therebetween. In this embodiment, the extension 73 of the guide member 7 is positioned parallel with the outer housing 13 in the upper region of the pressure container; therefore, after the lid assembly (Y) is separated from the opening 5, it moves while changing the configuration of the beam members 2 (see FIG. 4), and is retracted to the stored position on the housing 13.

The thin plate member 1 is preferably about 1 mm thick and may be made of spring steel (SKS) or the like superior in durability under repeated bending. Further, as for the beam members 2, considering strength and weight, shape steel, e.g., H shape steel may be used. In addition, it is desirable that the central portion of each beam member where the greatest stress occurs when it is subjected to the internal pressure in the pressure container be thicker.

Figure 10:
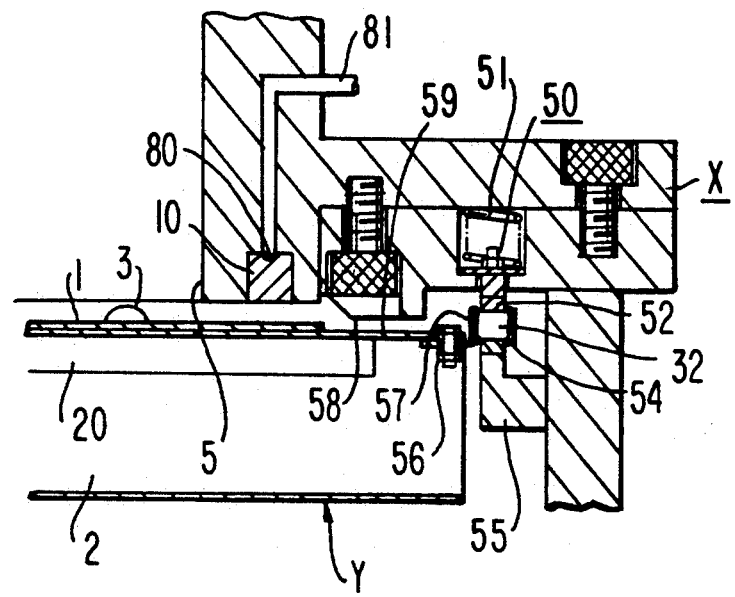
FIG. 10 is a fragmentary sectional view showing the operating state of the moving means before the opening is closed.
Figure 11:
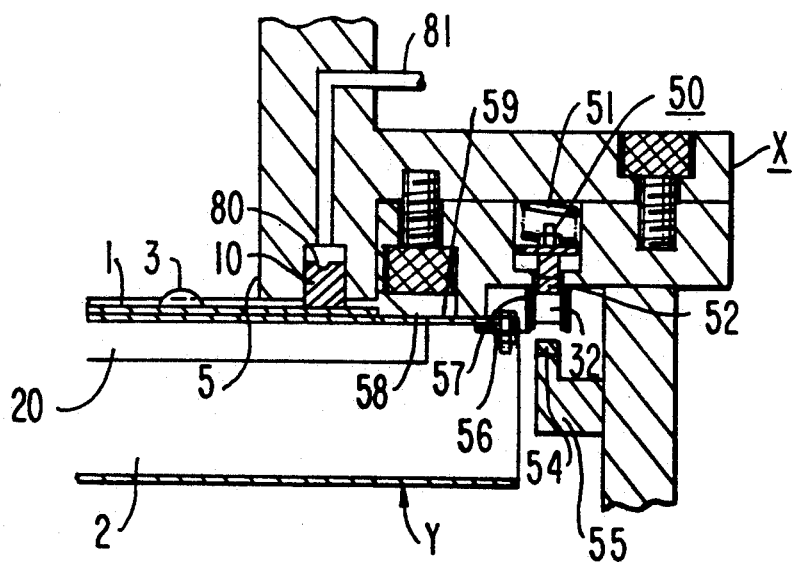
FIG. 11 is a fragmentary sectional view showing the operating state of the moving means after the opening is closed.

In order to open and close the lid assembly (Y), moving means 30, which may be manually operated, having a construction suitable for automation is used to move the lid assembly (Y) back and forth in direction. For example, as shown in FIG. 4, the opening and closing operation of the lid assembly can be easily automated by a driving mechanism using a geared motor 31 and a chain 32. The connecting construction required for said chain 32 and lid assembly is shown in FIGS. 10 and 11.

Figure 5:
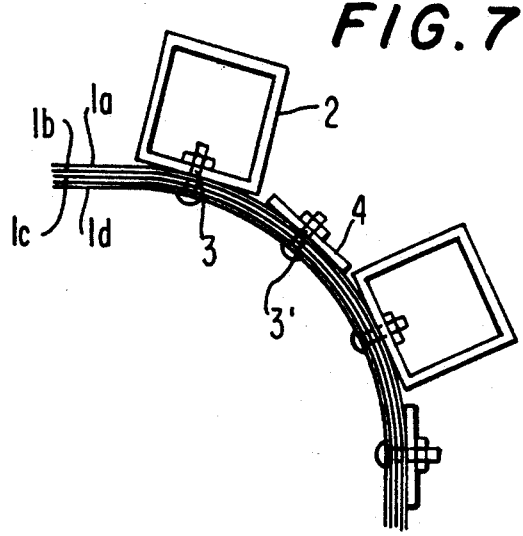
FIG. 5 is a fragmentary sectional view showing an example of construction of the lid assembly.

In FIG. 5, how the seal plate 1 and the beam members 2 are joined together is shown by way of example. In the same figure, fasteners 3 each consisting of a bolt and a nut should be such that besides the ability to join two members, they are capable of sealing them to prevent leakage of pressure. To this end, the seal plate 1, beam members 2 and fasteners 3 are finished with high dimensional accuracy.

Figure 6:
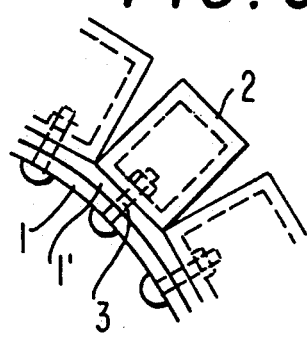
FIG. 6 is a fragmentary sectional view showing another example of construction of the lid assembly.

FIG. 6 shows another embodiment, in which a cushion member 1' is used to improve the sealing quality between the seal plate 1 and the beam members 2.

Figure 7:
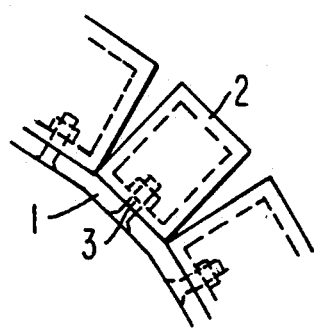
FIG. 7 is a fragmentary sectional view showing another example of construction of the lid assembly.

Further, in an example shown in FIG. 7, a number of seal plates are stacked in multi-layer construction 1a, 1b, 1c, 1d, thereby ensuring increased durability and smooth bending. In the same figure, the numeral 4 denotes an intermediate keep plate.

Figure 8:
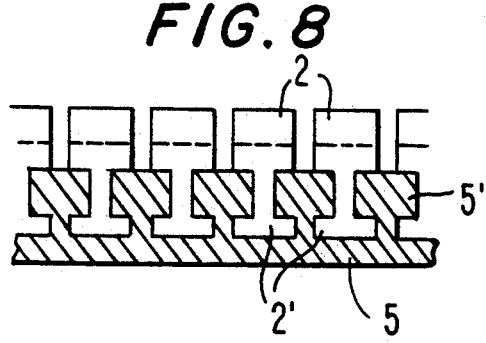
FIG. 8 is a fragmentary sectional view showing yet another example of construction of the lid assembly.

In an example shown in FIG. 8, an improved seal plate made of elastic material shown at numeral 5 is used to clamp the beam members 2. In this example, the proximal end 2' of each beam member 2 is elastically supported between adjacent upper portions of the seal plate 5.

Figure 9:
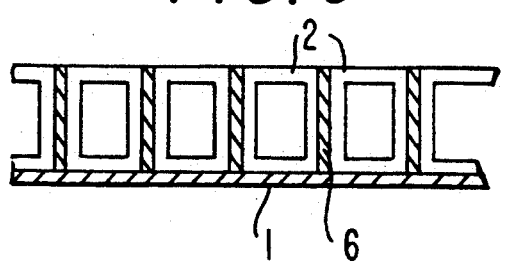
FIG. 9 is a fragmentary sectional view showing still another example of construction of the lid assembly.

Besides these, as shown in FIG. 9, it is preferable to interpose a cushion plate 6 between adjacent beam members 2 for cushioning purposes.

In driving the lid assembly (Y) of this invention, the seal plate 1 or an accessory thereto is frequently contacted by the seal member 10 opposed thereto and it is desirable to prevent damage particularly to the seal member 10. In this connection, FIGS. 10 and 11 show urging means 50 for urging the chain 32 to move away from the autoclave body (X), or the opening 5. The urging means 50 comprises a stem member elastically pressed by a spring 51 in a direction to project outward and connected to the chain 32 through a bearing member 52 disposed at the front end. Disposed on the opposite side with respect to the chain 32 is another bearing member 54 supported by a support 55.

With the arrangement thus made, before the opening is closed, that is, when the lid assembly (Y) is not pressed against the opening 5, chain 32 is held by the action of the urging means 50 at a position where the chain contacts the bearing member 54 disposed at the outside position. And the seal plate 1 is positioned integrally with the beam members 2 with a predetermined spacing from the opening 5 through a bracket 57 extending from the chain 32 and a connector 56 connecting said bracket to the ends of the beam members 2. The spacing should be such that there is no interference between the inner surface of the seal plate 1 and the seal member 10 or between the fasteners 3 projecting from the seal plate 1 and the seal member 10.

Figure 12:
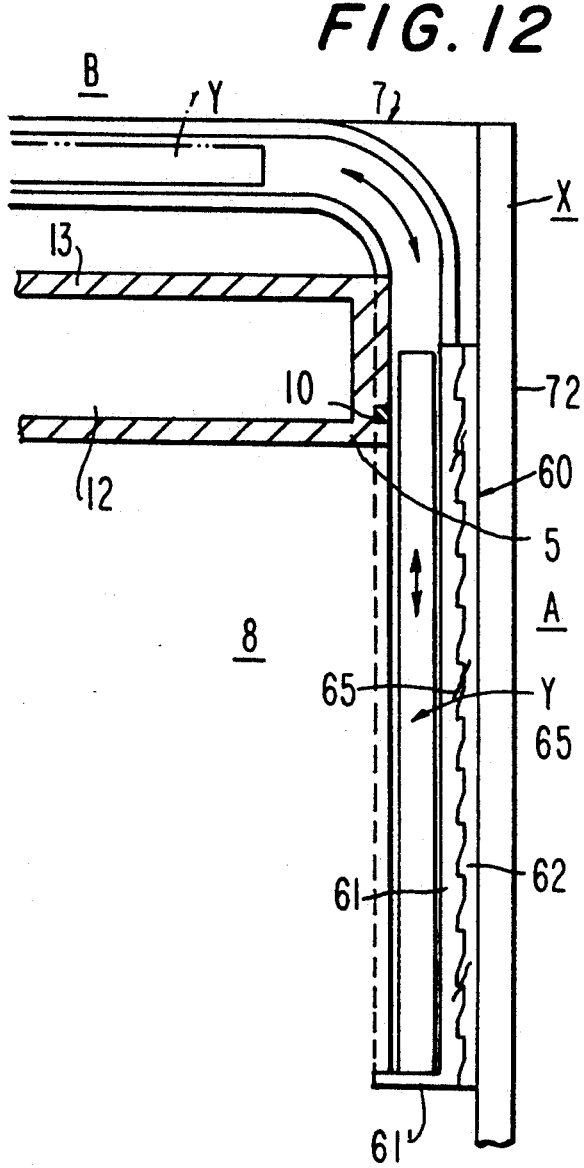
FIG. 12 is an enlarged sectional view showing an example of pressing means for pressing the lid assembly against the opening.

FIG. 11 shows the state (pressed state) in which the lid assembly (Y) is pressed against the opening 5 by the action of pressing means 60 to be later described. As is clear from this, when the opening is to be closed, the chain 32 is pushed toward the body (X) to allow the inner surface of the seal plate 1 to contact the end surface of the seal member 10. In FIGS. 11 and 12, the numeral 58 denotes the stop surface of the body (X) and the numeral 59 denotes an engaging surface opposed to said stop surface.

Next, referring to FIG. 12, there is shown an embodiment of the pressing means 60 comprising a set of serrated members 61 and 62. The numeral 65 denotes spring members elastically connecting said set of members. One of the serrated or cam-like members 61 and 62, or the outside serrated member 62 in this embodiment, is given a desired amount of movement by the spring members 65 and is provided with an engaging portion 61' at the lowermost end thereof. Thus, when the lower end of the lid assembly (Y) abuts against the engaging portion 61' at the final stage where the lid assembly (Y) reaches the closed position, the inside cam-like member 61 is somewhat pushed upward together with the lid assembly (Y). As a result, the inside serrated member 61 is pushed out under the action of meshing with the outside serrated member 62, so that the lid assembly is urged toward the opening 5.

Figure 14:
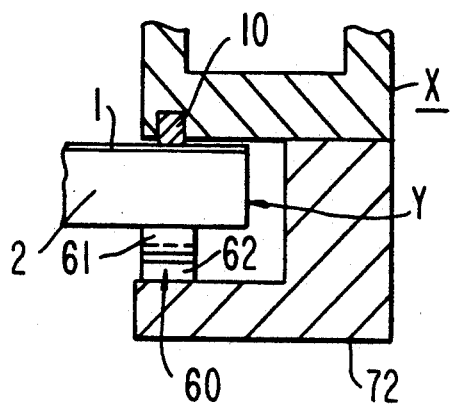
FIG. 14 is a fragmentary sectional view showing the operating state of the pressing means after the opening is closed.
Figure 13:
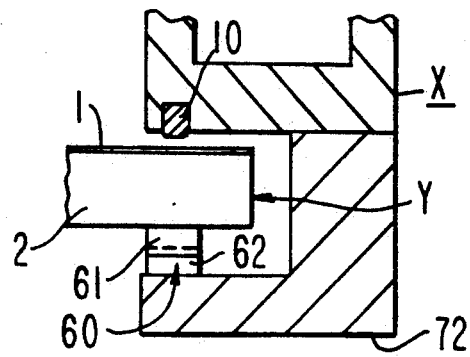
FIG. 13 is a fragmentary sectional view showing the operating state of the pressing means before the opening is closed.

FIG. 13 shows the lid assembly (Y) before closing the opening 5, and FIG. 14 shows the subsequent closed of the opening 5. As can be understood therefrom, the actual action (pressing force) of the pressing means 60 is brought about as the lid assembly (Y) is moved and it is canceled when retracted from the closed position.

Figure 15:
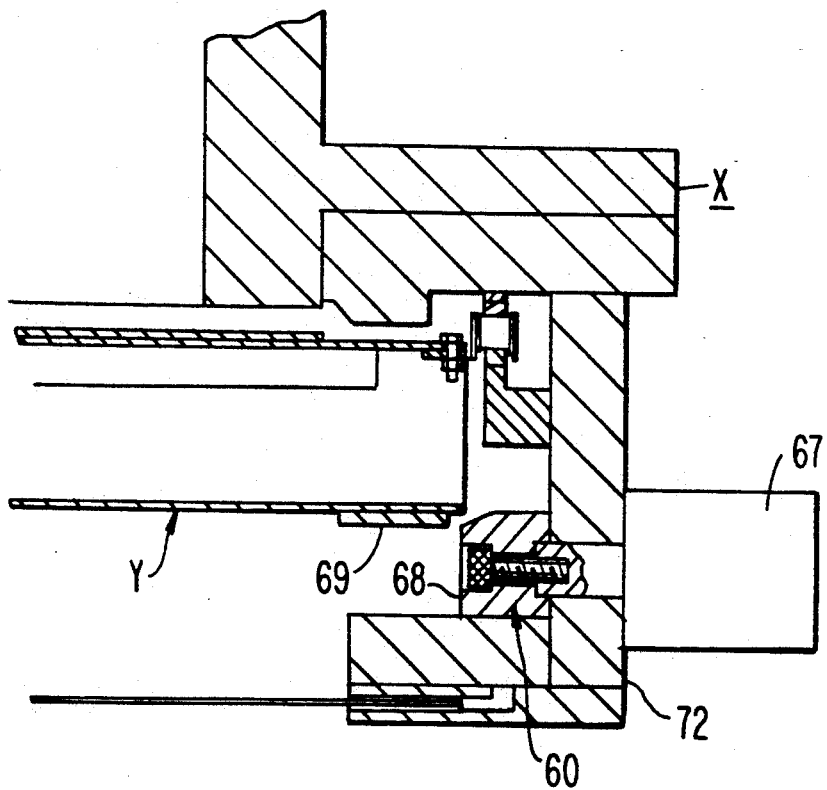
FIG. 15 is a fragmentary sectional view showing another example of construction of the pressing means.

FIG. 15 shows another example of the pressing means for the lid assembly (Y). In this example, said set of cam-like members 61 and 62 are replaced by a wedge member 68 driven by a cylinder 67 and a pressure receiving plate 69 engaging said wedge member. The same figure shows the opened state, the closed state not shown.

The shutter device according to this invention has a novel lid assembly described above, capable of retaining sufficient strength and fluid tightness even in heated conditions and produces great industrial merits when applied to various pressure containers. Further, the novel lid opening mechanism connected to the lid assembly makes it possible to attain a safe and reliable opening and closing operation and to manufacture the entire device in compact form.

Further, embodying the shutter device of this invention makes it possible to reduce the space for moving the lid assembly and the space for storing the same. As a result, the limitations on installing the lid assembly are eased to a great extent, allowing the surplus space to be effectively utilized. Further, the mechanism for opening and closing the lid assembly can be simplified to automate the opening and closing operation, contributing much to labor saving and safety driving.

Further, because of the merits described above, this invention encourages wide use of large-sized pressure containers.

Particularly, when applied to autoclaves for medical use or retorts for food processing whose treating chambers are put in pressurized and depressurized states, the invention contributes to increased safety and labor saving.

We claim:

1. A shutter device for a pressure container having a pressurized state and a depressurized state, the shutter comprising:
   a lid assembly including a flexible seal plate having an outer surface, and a number of widthwise extending beam members applied to the outer surface of the seal plate;
   a stationary guide track for guiding the seal plate for sliding movement between a closed position in which the seal plate overlies an opening of the container, and a stored position in which the seal plate is remote from the opening, said guide track having at least one bend between the closed position and the stored position;
   moving means for moving the lid assembly along the guide track between said positions; and
   pressing means for sealingly pressing the lid assembly against the opening of the container in the closed position to maintain an fluid-tight seal in the pressurized and depressurized states.

2. The shutter device according to claim 1, in which the outer surface of the seal plate is substantially flat, and in which each beam member has a rectangular cross section, said beam members being joined to the seal plate by fasteners at a number of connecting points arranged widthwise of the seal plate.

3. The shutter device according to claim 1, in which the seal plate is a composite structure and includes a cushion member thereon.

4. The shutter device according to claim 1, in which the seal plate is a multi-layer structure and includes multiple members.

5. The shutter device according to claim 1, in which the seal plate is constituted of an elastic material, and in which the beam members are clamped at uniform intervals on the elastic seal plate.

6. The shutter device according to claim 1, in which the moving means includes a chain extending along the guide track and a geared motor for driving the chain; and further comprising a bracket member and fasteners for connecting the chain to the beam members.

7. The shutter device according to claim 6, in which the moving means includes urging means for urging the chain in a direction away from the opening of the container.

8. The shutter device according to claim 1, in which the pressing means includes a plurality of serrated members.

9. The shutter device according to claim 8, in which the serrated members are elastically connected to one another by a spring member, and in which one of the serrated members has an engaging portion for urging the lid assembly toward the opening of the container in the closed position.

10. The shutter device according to claim 1, in which the lid assembly is positioned in a substantially vertical orientation in the closed position, and in a substantially horizontal orientation in the stored position.

* * * * *